Nov. 22, 1949     R. N. HOEHN ET AL     2,488,538
AIR-SEA PERSONNEL RESCUE PICKUP SYSTEM
Filed April 10, 1946     2 Sheets-Sheet 1
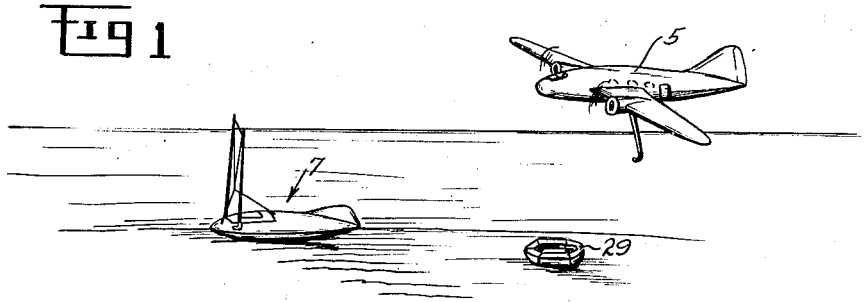
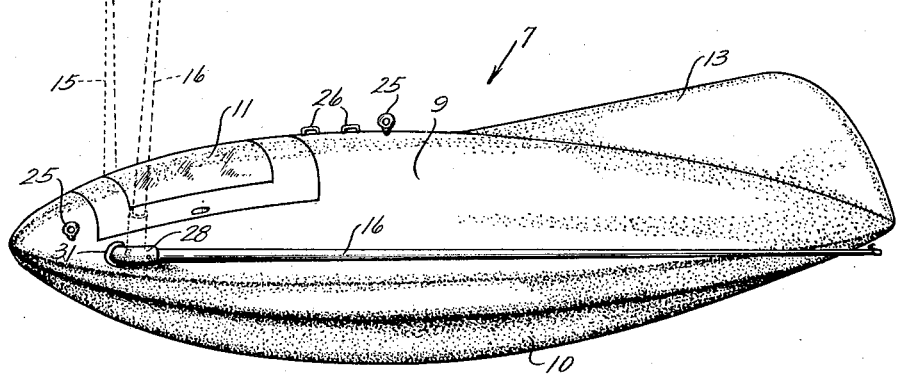
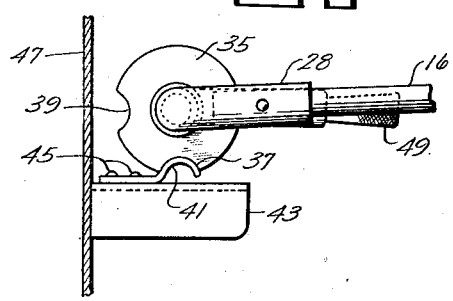
INVENTORS
ROBERT N. HOEHN
HAROLD E. ROHAN
BY
HIS ATTORNEYS Nov. 22, 1949     R. N. HOEHN ET AL     2,488,538
AIR-SEA PERSONNEL RESCUE PICKUP SYSTEM
Filed April 10, 1946     2 Sheets-Sheet 2
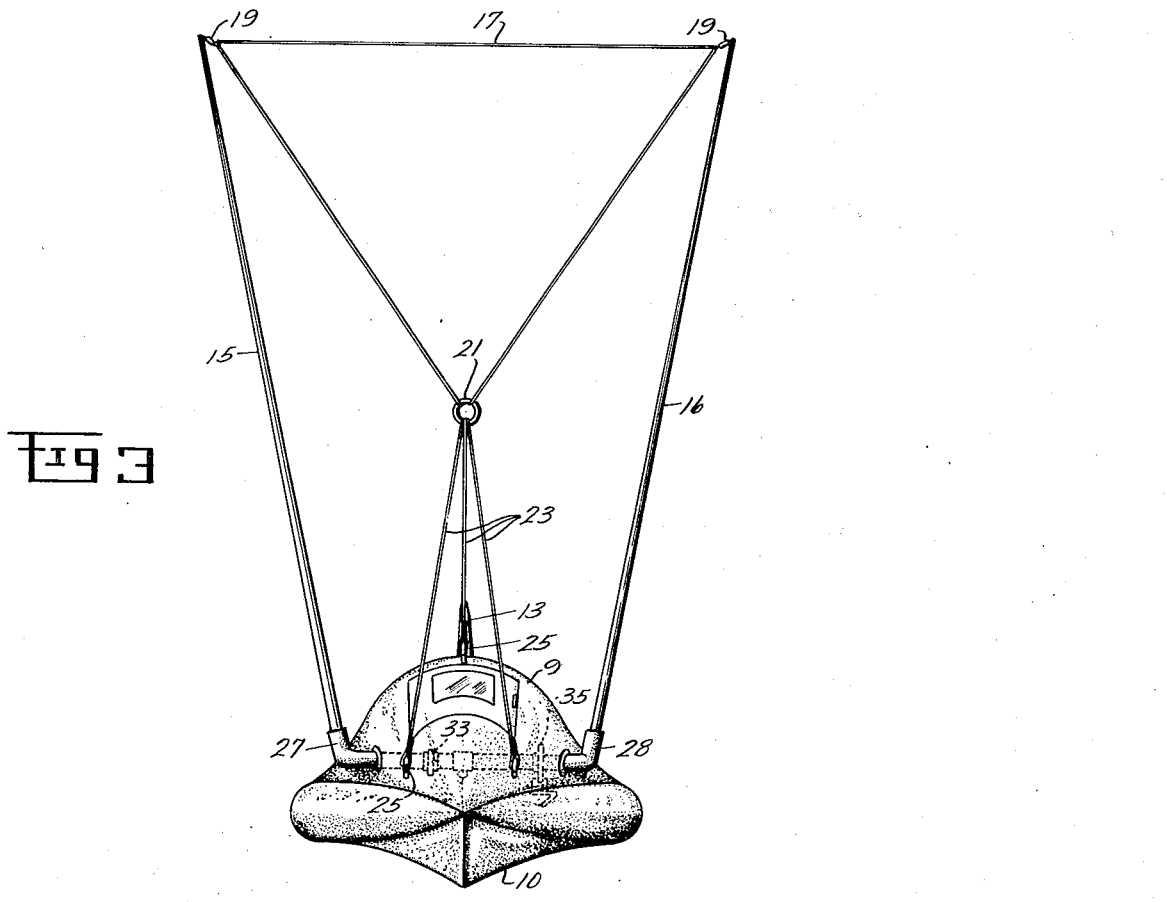
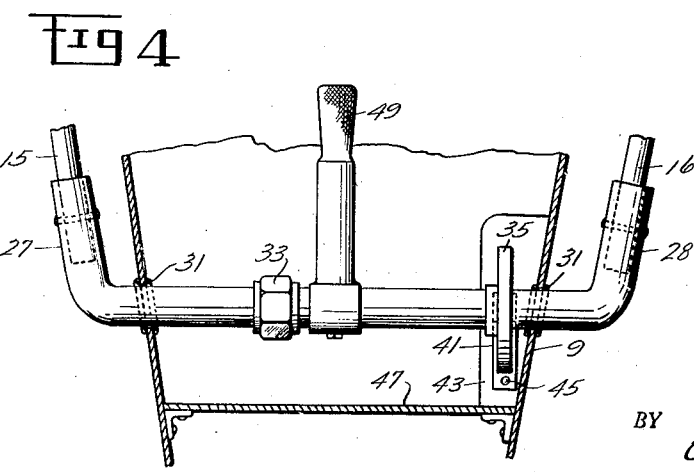

Patented Nov. 22, 1949

2,488,538

UNITED STATES PATENT OFFICE 2,488,538

AIR-SEA PERSONNEL RESCUE PICKUP SYSTEM

Robert N. Hoehn, Troy, Ohio, and
Harold E. Rohan, Miami, Fla.

Application April 10, 1946, Serial No. 661,037

3 Claims. (Cl. 258—1.2)

(Granted under the act of March 3, 1883, as amended April 30, 1928; 370 O. G. 757)

The invention described herein may be manufactured and used by or for the Government for governmental purposes without the payment to us of any royalty thereon.

This invention relates to an aerial pick-up system and more particularly to an air-sea rescue pick-up system in which a land-based aircraft is used for rescuing personnel downed at sea.

As long as aircraft operate over large bodies of water, there always exists the danger of aircraft crashing at sea. While many means have been developed to keep the personnel of the downed aircraft afloat on water, the immediate rescue of this personnel is often impossible, even though imperative. It is often not feasible for rescue aircraft to land on the water to pick up this personnel, due to rough water and the fact that the rescue aircraft may not be of the amphibious type.

Therefore, it is an object of this invention to provide an air-sea rescue pick-up system for rescuing personnel downed at sea, by means of a land-based aircraft.

It is a further object of this invention to provide a watertight floating personnel rescue container capable of carrying personnel, which can be dropped from an aircraft onto the water near the personnel to be rescued, and can be picked up from the water by the aircraft while in flight.

It is a further object of this invention to provide a floating personnel rescue container having its upper portion aerodynamically streamlined, its lower portion formed with a V bottom, and provided with a flight stabilizing fin so that the personnel rescue container will be stable and will provide a minimum of drag on the aircraft, both while in the water and in flight, when the pick-up occurs.

It is a still further object of this invention to provide a personnel rescue container having a pick-up loop releasably supported by masts which are pivotally supported by the container. The masts to be rotated to an upright position by the occupant of the container prior to the pick-up, and lowered to a position horizontally adjacent to the container after the pick-up loop has engaged the pick-up apparatus of the aircraft in flight, and become disengaged from the personnel rescue container.

These and other objects of our invention will become apparent from the following detailed description taken in conjunction with the accompanying drawing in which:

Fig. 1 is a perspective view of the air-sea rescue pick-up system.

Fig. 2 is a perspective view of the personnel rescue container showing the pick-up masts in the horizontal position.

Fig. 3 is a front view of the personnel rescue container showing the pick-up masts in the vertical position.

Fig. 4 is an enlarged fragmentary view of the pick-up mast operating mechanism.

Fig. 5 is an enlarged fragmentary view of the pick-up mast locking mechanism.

Referring to Figs. 2 and 3, it will be seen that the personnel rescue container 7 has its upper portion 9 aerodynamically streamlined so as to provide a minimum of air resistance when the personnel rescue container 7 is in the air. The lower or water-borne portion 10 of the container 7 is formed with a V bottom similar to that employed on flying boat hulls. This type of bottom provides a minimum of water resistance when the personnel rescue container 7 is being towed through the water, by the pick-up aircraft, as well as stability while in the water.

A dorsal fin 13 is provided on the upper surface of the container 7, aft of the center of container 7. This fin 13 acts as a flight stabilizer for the container 7 when it is being towed through the air.

The size of the container 7 depends on the number of people it is intended to pick up. The container 7 shown here is designed to accommodate one person, but could easily be made so as to accommodate more occupants.

On the upper surface of the container 7 is a hatch 11, which when opened provides an opening large enough for a man to crawl through. The hatch 11 when lowered into place and locked is watertight, thus making the entire container 7 watertight and floatable.

Masts 15 and 16, pivotally supported on the container 7, are provided to support a pick-up loop 17 secured between the tops of masts 15 and 16 by releasable spring clips 19. The pick-up loop 17 is attached by a ring 21 to three cables 23 which in turn are each connected to eye bolts 25 secured to the upper surface of container 7. The eye bolts 25 are so located that when the container 7 is picked up by the aircraft, it will be balanced in flight.

Eye bolts 26 are provided, on the top of container 7, for the attachment of a parachute used when the container 7 is dropped from the aircraft 5 to the personnel to be rescued.

Referring to Fig. 4, the lower end of masts 15 and 16 are respectively inserted and pinned into tubular elbows 27 and 28. Elbows 27 and 28 extend through watertight journals 31 mounted in the sides of container 7 and are joined inside container 7 by a fitting 33, thus forming a yoke pivotally supported by journals 31. The connected elbows 27 and 28 are the masts 15 and 16 secured to the respective elbows provide a U-shaped loop-supporting structure, as shown best in Fig. 3.

Attached to elbow 28 is a lock wheel 35 provided with detents 37 and 39 as shown in Fig. 5. When the masts 15 and 16 are in a horizontal position, detent 37 engages a retaining spring 41 which is riveted to a plate 43 by rivets 45. The plate 43 is attached both to the wall of container 7 and a former 47. When the detent 37 engages the retaining spring 41, the elbows 27 and 28 are locked in place and therefore the masts 15 and 16 cannot move. Detent 39 is used to lock the masts 15 and 16 in a vertical position.

Within container 7, at approximately the center of the yoke formed by elbows 27 and 28, a handle 49 is securely attached. By moving this handle up and down, the yoke is rotated in the journals 31 and the masts 15 and 16 are moved between the horizontal and vertical positions. The masts 15 and 16 are kept in the horizontal position adjacent the container 7 at all times except when the actual pick-up operation is in process.

As illustrated in Fig. 1, a rescue aircraft 5, upon sighting personnel floating on the water, drops the personnel rescue container 7 by parachute near the life raft 29. The person, or persons, to be rescued then boards the container, removes the parachute, raises the hatch 11 and enters the container. It is necessary for the occupant, or occupants, to lie in a prone position during the entire pick-up operation. The inside of the container is well padded and a chest harness is provided for shock. After entering the container and getting into the proper position, the hatch is lowered and locked so that it is watertight. Then the handle on the yoke is pushed up, rotating the masts to a vertical position. The container is then ready to be picked up. The aircraft flies over with its pick-up apparatus lowered and the pick-up loop on the container is hooked by the pick-up apparatus on the aircraft. The pick-up loop then becomes disengaged from the masts due to the action of the spring clips 19 in releasing the pick-up loop from the masts. When the pick-up loop becomes disengaged and the container starts to move, the occupant of the container pulls the yoke handle down, rotating the masts from the vertical to the horizontal position to thereby reduce the aerodynamic drag. After the container rises into the air, it is pulled up into the bomb bay, or other such opening in the aircraft, by means of the pick-up apparatus. The rescued person is then removed from the container and is safe inside the aircraft. If more people are to be picked up, the cable is rerigged to the masts, and another parachute is attached to the container. It is then dropped out of the aircraft and the same process is repeated.

It will thus be seen that we have provided an air-sea rescue pick-up system in which it is not necessary for the aircraft to land on the water in order to accomplish that rescue. We have also provided for a personnel rescue container which can easily be picked up by an aircraft in flight and which will provide as little resistance to the air and water as possible.

While we have described a preferred embodiment, it is to be understood that we do not wish to be restricted thereto, and that we intend to cover all modifications thereof which would be apparent to one skilled in the art and which comes within the spirit and scope of the appended claims.

We claim:

1. In an aerial pick-up system, a streamlined container adapted to house personnel during the pick-up operation, a yoke comprising a rotatable member extending transversely through the interior of said container, a handle integral with said member within said container to rotate said member and said yoke manually, said yoke further comprising an elbow portion on each end of said rotatable member exteriorly of said container, a mast secured to each of said elbows and extending radially from said rotatable member in coplanar relation thereto to provide a U-shaped loop-supporting structure, a pick-up loop releasably supported at two spaced points by the free ends of said masts, means securing said pick-up loop to said container, said pick-up loop including a transversely extending pick-up portion between said two spaced points which is elevated to a pick-up position when said masts are raised by rotation of said rotatable member, said pick-up portion being adapted for engagement by an aerial pick-up means carried by an aircraft which is guided so as to engage the latter means with said pick-up portion of said pick-up loop and simultaneously release said pick-up loop from the free ends of said masts, whereby said masts may then be lowered to reduce aerodynamic drag on the container and whereby said container may be carried aloft by said aircraft.

2. In an aerial pick-system as recited in claim 1, wherein said streamlined container provides a fully enclosed boat hull having sufficient buoyancy to float in water when occupied by said personnel, and wherein said rotatable member is located near the forward end of said hull.

3. In an aerial pick-up system as recited in claim 1, wherein said streamlined container provides a fully enclosed boat hull having sufficient buoyancy to float in water when occupied by said personnel, and wherein opposite walls of said hull near the forward end thereof are provided with bearings for said rotatable member.

ROBERT N. HOEHN.
HAROLD E. ROHAN.

REFERENCES CITED

The following references are of record in the file of this patent:

UNITED STATES PATENTS

| Number | Name | Date |
|---|---|---|
| 1,885,765 | Ricks | Nov. 1, 1932 |
| 1,907,347 | Denney et al. | May 2, 1933 |
| 2,418,702 | Du Pont | Apr. 8, 1947 |